United States Patent
Chiu

(10) Patent No.: US 8,657,306 B2
(45) Date of Patent: Feb. 25, 2014

(54) LIFTING MACHINE BASE ASSEMBLY FOR A MACHINE TOOL

(75) Inventor: Cheng-Hung Chiu, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 154 days.

(21) Appl. No.: 13/253,434

(22) Filed: Oct. 5, 2011

(65) Prior Publication Data

US 2012/0085882 A1 Apr. 12, 2012

(30) Foreign Application Priority Data

Oct. 7, 2010 (TW) ................................ 99134218 A

(51) Int. Cl.
*B60B 33/06* (2006.01)
*B62B 5/00* (2006.01)

(52) U.S. Cl.
CPC .................................. *B62B 5/0083* (2013.01)
USPC ...................................... 280/43.24; 280/43.1

(58) Field of Classification Search
CPC .............................. B62B 5/0083; B60B 33/06
USPC ................. 280/6.15, 35, 43.12, 43.13, 43.14, 280/43.17, 43.24, 6.151, 6.153, 6.154, 280/6.155, 638; 108/20, 21, 22, 144.11, 108/145, 147, 147.22; 312/27, 28, 30, 312, 312/319.1, 319.5, 319.6, 319.7, 319.9, 325; 414/458, 459, 540, 546; 248/651, 669
See application file for complete search history.

(56) References Cited

U.S. PATENT DOCUMENTS

| | | | | |
|---|---|---|---|---|
| 723,692 | A * | 3/1903 | Litsey | 280/35 |
| 2,042,489 | A * | 6/1936 | Williams | 280/43.14 |
| 2,537,909 | A * | 1/1951 | Puddester | 188/5 |
| 2,624,590 | A * | 1/1953 | Tilton | 280/43.14 |
| 2,628,068 | A * | 2/1953 | Sehnert | 254/10 C |
| 2,783,055 | A * | 2/1957 | Michaud | 280/43.14 |
| 2,812,189 | A * | 11/1957 | Eduard | 280/43.14 |
| 2,937,850 | A * | 5/1960 | Winkler et al. | 254/8 R |
| 2,993,740 | A * | 7/1961 | Good | 108/80 |
| 3,534,974 | A * | 10/1970 | Jerrard et al. | 280/43.24 |
| 3,544,127 | A * | 12/1970 | Dobson | 280/43.17 |
| 3,618,966 | A * | 11/1971 | Vandervest | 280/43.17 |
| 3,733,623 | A * | 5/1973 | Croxton | 5/611 |
| 3,801,122 | A * | 4/1974 | Shoemaker et al. | 280/43.24 |
| 3,817,546 | A * | 6/1974 | Sugiura | 280/43.12 |
| 3,845,933 | A * | 11/1974 | Heizer, Jr. | 254/8 R |
| 4,063,616 | A * | 12/1977 | Gutierrez | 182/17 |
| 4,068,551 | A * | 1/1978 | Kreitz | 83/471.3 |
| 4,369,822 | A * | 1/1983 | Rice | 144/286.1 |
| 4,639,005 | A * | 1/1987 | Birkley | 280/43.14 |
| 4,723,808 | A * | 2/1988 | Hines | 296/20 |
| 4,726,405 | A * | 2/1988 | Bassett | 144/287 |

(Continued)

*Primary Examiner* — Hau Phan
*Assistant Examiner* — Jacob Meyer
(74) *Attorney, Agent, or Firm* — Bacon & Thomas, PLLC

(57) ABSTRACT

A lifting machine base assembly for use in a machine tool includes a machine base and a lateral wheel set. The lateral wheel set includes two lateral wheel frames respectively pivotally connected to two opposite sidewalls of the machine base, and a wheel shaft rotatably inserted through the machine base and eccentrically connected between the lateral wheel frames. A driving member is fastened to one end of the wheel shaft and operable to raise and lower the lateral wheel frames relative to the machine base and to further force the lateral wheels into contact with the floor to lift the machine base partially or wholly from the floor, allowing the operator to conveniently move the machine tool to a desired position by rotation of the lateral wheels.

17 Claims, 10 Drawing Sheets

(56) References Cited

U.S. PATENT DOCUMENTS

| | | | |
|---|---|---|---|
| 4,768,617 A * | 9/1988 | Mason et al. | 182/1 |
| 4,925,357 A * | 5/1990 | Cisternino et al. | 414/495 |
| 4,974,801 A * | 12/1990 | Pulsifer | 248/181.2 |
| 5,203,581 A * | 4/1993 | Jankowski | 280/87.051 |
| 5,308,094 A * | 5/1994 | McWhorter et al. | 280/43.17 |
| 5,403,022 A * | 4/1995 | Snider | 280/30 |
| 5,482,303 A * | 1/1996 | Meloy | 280/43.17 |
| 5,615,451 A * | 4/1997 | Peterson et al. | 16/34 |
| 5,628,522 A * | 5/1997 | Hall | 280/43.17 |
| 5,791,434 A * | 8/1998 | Swiderski | 182/17 |
| 5,826,893 A * | 10/1998 | Snoeyenbos | 280/43 |
| 5,876,173 A * | 3/1999 | English, Jr. | 414/458 |
| 5,941,341 A * | 8/1999 | Gillis et al. | 182/17 |
| 5,957,649 A * | 9/1999 | English et al. | 414/458 |
| D415,868 S * | 10/1999 | Hewitt | D34/23 |
| 6,079,931 A * | 6/2000 | English et al. | 414/458 |
| 6,095,533 A * | 8/2000 | Balolia | 280/35 |
| 6,109,625 A * | 8/2000 | Hewitt | 280/43.24 |
| 6,179,087 B1 * | 1/2001 | Moffat | 182/15 |
| 6,311,992 B1 * | 11/2001 | Theising | 280/79.11 |
| 6,421,854 B1 * | 7/2002 | Heimbrock | 5/610 |
| 6,533,524 B2 * | 3/2003 | English et al. | 414/458 |
| 6,659,706 B2 * | 12/2003 | English et al. | 414/458 |
| 6,715,979 B1 * | 4/2004 | Theising et al. | 414/458 |
| 6,837,665 B2 * | 1/2005 | English et al. | 414/458 |
| 6,843,625 B2 * | 1/2005 | Hewitt | 410/66 |
| 6,904,641 B2 * | 6/2005 | Magoto et al. | 16/19 |
| 6,971,656 B2 * | 12/2005 | Lin | 280/79.11 |
| 6,997,466 B2 * | 2/2006 | Wang | 280/43.17 |
| 7,077,406 B2 * | 7/2006 | Lin | 280/79.11 |
| 7,112,028 B2 * | 9/2006 | English et al. | 414/458 |
| 7,584,935 B2 * | 9/2009 | Chen | 248/647 |
| 8,246,059 B2 * | 8/2012 | Gass et al. | 280/43.14 |
| 2002/0043776 A1 * | 4/2002 | Chuang | 280/43.24 |
| 2005/0134011 A1 * | 6/2005 | Lin | 280/43.14 |
| 2005/0173877 A1 * | 8/2005 | Wang | 280/43.17 |
| 2005/0220585 A1 * | 10/2005 | English et al. | 414/458 |
| 2006/0045685 A1 * | 3/2006 | Warner et al. | 414/458 |
| 2006/0103092 A1 * | 5/2006 | Strahler et al. | 280/79.11 |
| 2008/0056871 A1 * | 3/2008 | Morgan et al. | 414/495 |
| 2009/0072117 A1 * | 3/2009 | Gampe | 248/651 |
| 2009/0224133 A1 * | 9/2009 | Gass et al. | 248/651 |
| 2010/0303593 A1 * | 12/2010 | Peacock | 414/458 |
| 2011/0062841 A1 * | 3/2011 | Penner et al. | 312/249.8 |
| 2011/0156365 A1 * | 6/2011 | Chiu | 280/43.24 |
| 2011/0158758 A1 * | 6/2011 | Chiu | 408/234 |

* cited by examiner

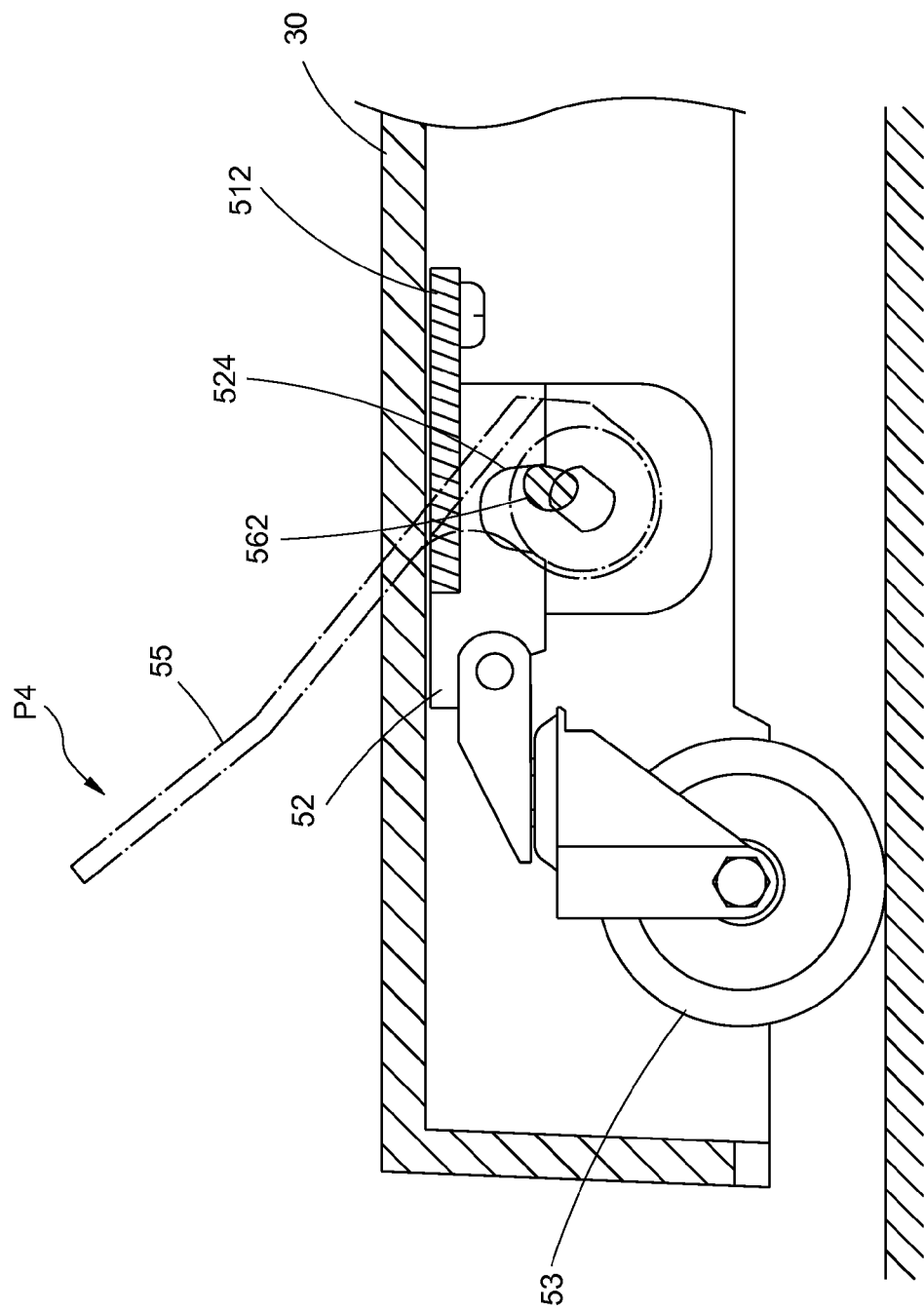

LIFTING MACHINE BASE ASSEMBLY FOR A MACHINE TOOL

This application claims, under 35 U.S.C. §119, priority to Taiwanese Application No. 099134218, filed Oct. 7, 2010, which application is hereby incorporated by reference in its entirety, inclusive of the specification, claims, and drawings.

FIELD OF THE INVENTION

The present disclosure relates to a machine tool and more particularly, to a lifting machine base assembly for a machine tool.

BACKGROUND

Regular floor type machine tools (such as drill presses) are commonly quite large and very heavy, and are not easily movable by an operator. In particular, in order to move a floor type machine tool from one position to another, several persons are typically required to join together and to lift the floor type machine tool above the floor for movement thereof. Thus, a large amount of labor and time are required in order to move a floor type machine tool. Additionally, there is substantial risk of personal injury or machine tool damage that may accidentally occur during movement of the machine tool. Therefore, moving a floor type machine tool in this manner is difficult and dangerous.

SUMMARY

The present disclosure has been accomplished under the circumstances in view. Accordingly, the present disclosure describes exemplary embodiments of a lifting machine base assembly for a machine tool, which is equipped with liftable wheels so that the operator can operate the machine tool in place on a floor or other supporting surface when the liftable wheels are not lowered, and can conveniently move the machine tool when the liftable wheels are lowered into contact with the floor.

To achieve this and other objects of the present disclosure, a machine base assembly for a machine tool includes a machine base and a lateral wheel set. The lateral wheel set includes two lateral wheel frames respectively pivotally connected to the machine base of the machine tool, two lateral wheels respectively rotatably mounted to the lateral wheel frames, a rotatable wheel shaft inserted through the machine base and eccentrically coupled between the two lateral wheel frames. At least one driving member is connected to one end of the wheel shaft and operable to rotate the wheel shaft.

When the driving member is in a first position, the machine base is maintained in contact with the floor, and therefore the machine tool is firmly held in place for operation by a user. When the driving member is moved by an external force from the first position to a second position, the lateral wheel frames are pivoted by the wheel shaft to move the lateral wheels into contact with the floor, and the machine base is partially or wholly lifted from the floor, allowing the machine tool to be conveniently moved to a desired position.

Further, in one embodiment of the present disclosure, the machine base assembly further includes a bottom wheel set. The bottom wheel set includes a mounting frame affixed to the machine base, a wheel holder having a middle part thereof pivotally connected to the mounting frame, and a bottom wheel rotatably coupled to the front end of the wheel holder. A rotating shaft is rotatably inserted through the machine base and the bottom wheel frame and has first and second distal ends. The first distal end thereof is eccentrically connected to the rear end of the wheel holder, and a lever is connected to the second distal end of the rotating shaft and operable to rotate the rotating shaft. When the lever is in a third position, the machine base is maintained in contact with the floor, and when the lever is in a fourth position, the bottom wheel holder is pivoted by the rotating shaft to force the bottom wheel into contact with the floor, thus lifting the machine base partially or wholly from the floor.

BRIEF DESCRIPTION OF THE DRAWINGS

FIG. 8 is an enlarged partial view of a portion of FIG. 7, illustrating the lever in the fourth position.

DETAILED DESCRIPTION

Figure 1:
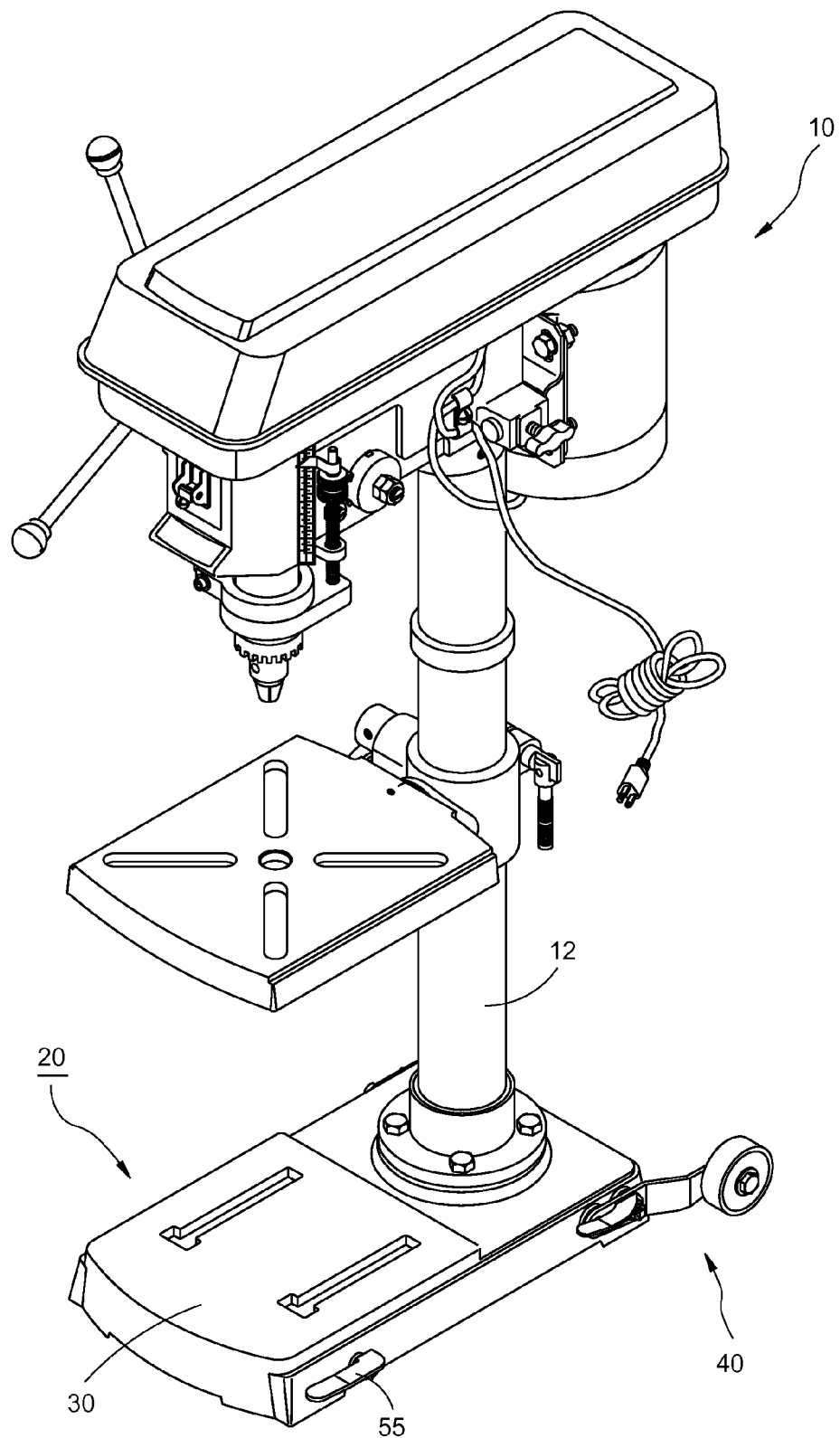
FIG. 1 is an elevational view of a machine tool equipped with a lifting machine base assembly in accordance with a first embodiment of the present disclosure.
Figure 2:
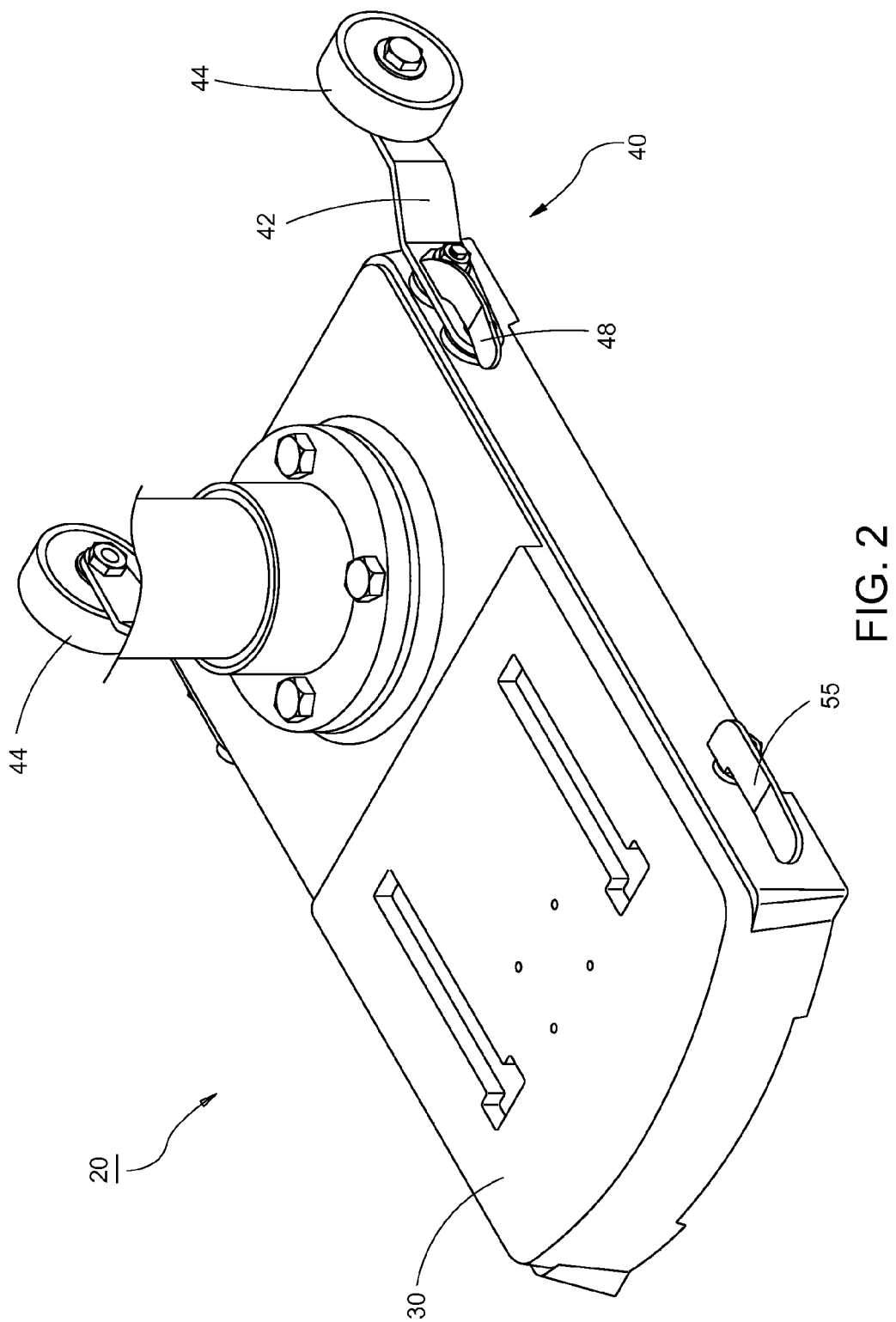
FIG. 2 is an elevational view of the machine base assembly in accordance with the first embodiment of the present disclosure.
Figure 3:
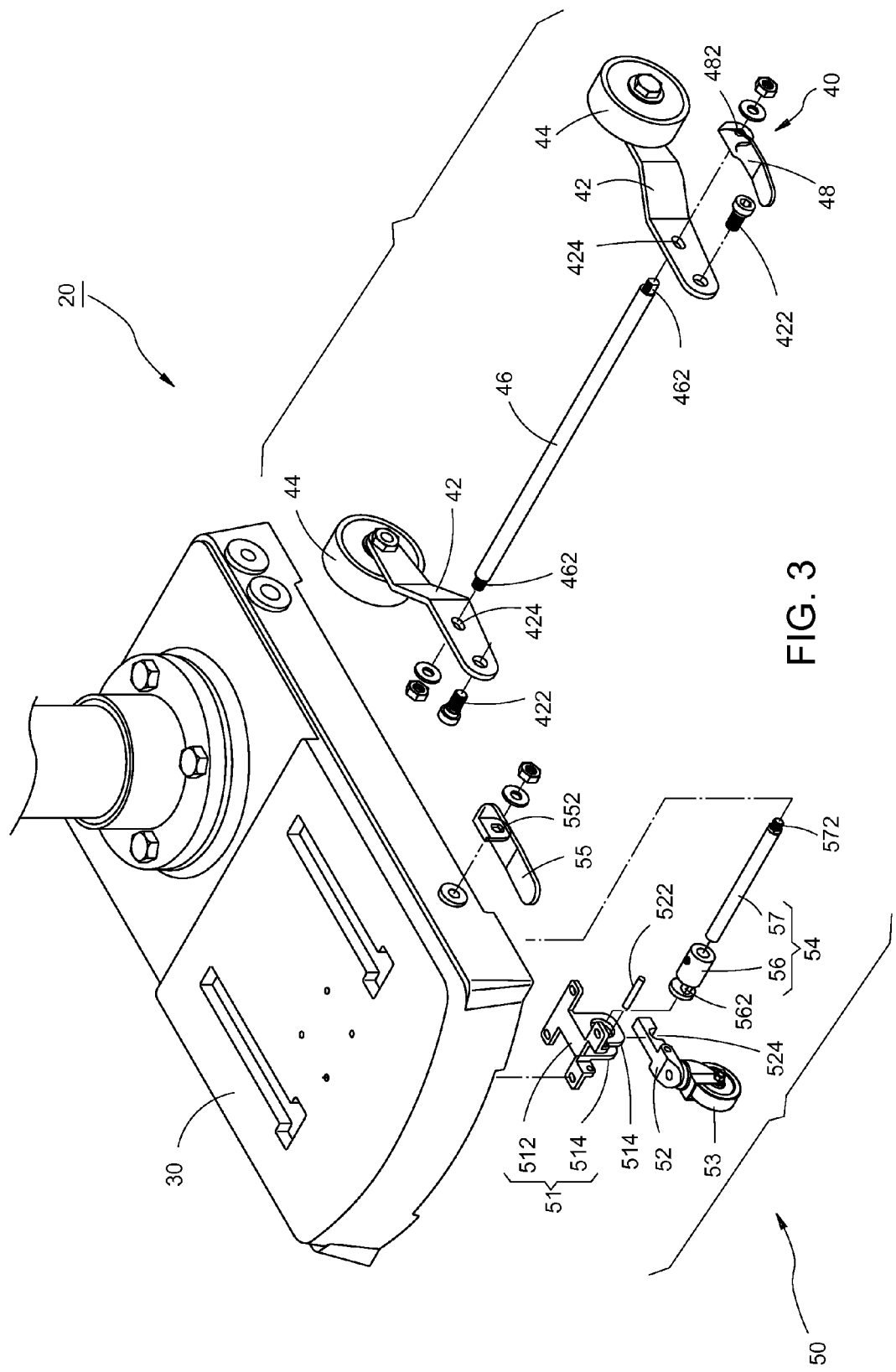
FIG. 3 is an exploded view of a part of the machine base assembly in accordance with the first embodiment of the present disclosure

Referring to FIG. 1, a machine base assembly 20 in accordance with a first embodiment of the present disclosure is shown installed in a machine tool 10 (for example, but not limited to, a drill press). As further illustrated in FIGS. 2 and 3, the machine base assembly 20 includes a machine base 30, a lateral wheel set 40 and a bottom wheel set 50.

The machine base 30 has a front bottom wall thereof configured for supporting the bottom wheel set 50, opposed lateral sidewalls of the rear side thereof configured for supporting the lateral wheel set 40, and a rear top wall fixedly connected to a support member 12 of the machine tool 10 to provide stable support to the machine tool 10.

The lateral wheel set 40 includes two lateral wheel frames 42, two lateral wheels 44, a wheel shaft 46, and at least one driving member 48. The lateral wheel frames 42 are respectively pivotally connected at the two opposed lateral sidewalls at the rear side of the machine base 30 by a respective pivot member 422. The lateral wheel frames 42 also respectively extend out beyond the rear side of the machine base 30. Each lateral wheel frame 42 is configured for pivotally supporting one respective lateral wheel 44 at the rear end thereof extending beyond the rear side of the machine base 30.

Each lateral wheel frame 42 has a first oblong hole 424 spaced along the length thereof near the front end of the frame 42. A rotatable wheel shaft 46 is inserted through the machine base 30. The wheel shaft 46 has an eccentric end portion 462 at each of the two opposite ends thereof. Each end portion 462 has an oblong cross section, and is inserted into one of the first oblong holes 424 of one of the respective lateral wheel frames 42. Thus, the lateral wheel frames 42 can carry the lateral wheels 44 movable up and down with respect to the machine base 30.

A driving member 48 has a second oblong hole 482. The major axis of the second oblong hole 482 extends perpendicular to the major axis of the first oblong hole 424 of each lateral wheel frame 42. Further, the second oblong hole 482 has a shape corresponding to, and is configured to fit, the cross section of the end portions 462 of the wheel shaft 46. In this manner, one end portion 462 of the wheel shaft 46 can be positively secured to the second oblong hole 482 of the driving member 48 and firmly fastened thereto by a screw joint, allowing the wheel shaft 46 to be rotated by selective movement of the driving member 48.

The bottom wheel set 50 includes a mounting frame 51, a wheel holder 52, a bottom wheel 53, a rotating shaft 54 and a lever 55. The mounting frame 51 has a top wall 512 and two sidewalls 514. The top wall 512 is affixed to the bottom wall of the machine base 30. The two sidewalls 514 are downwardly extended from the top wall 512 and spaced from each other at a predetermined distance. The wheel holder 52 has a middle part thereof pivotally connected by pin 522 between the two sidewalls 514 of the mounting frame 51, and a bottom retaining notch 524 disposed near the rear end thereof. The bottom wheel 53 is rotatably coupled to the front end of the wheel holder 52.

The rotating shaft 54 has a first shaft member 56 and a second shaft member 57. The first shaft member 56 has a first end thereof, namely, the inner end rotatably inserted through the two sidewalls 514 of the mounting frame 51 and is provided with an eccentric block 562 that is engaged with the bottom retaining notch 524 of the wheel holder 52. A second end thereof, namely, the outer end of the first shaft member 56 is axially tightly fastened at a first end of the second shaft member 57. The second shaft member 57 has the first end thereof axially tightly fastened to the second, outer end of the first shaft member 56, and a second end thereof terminating in a threaded end portion 572. The threaded end portion 572 has a substantially oblong cross section, and extends through the sidewall to the outside of the machine base 30.

The lever 55 has a third oblong hole 552 corresponding in shape and fitting the cross section of the threaded end portion 572 of the second shaft member 57. The threaded end portion 572 of the second shaft member 57 of the rotating shaft 54 can be firmly secured to the third oblong hole 552 of the lever 55 and threadingly connected to the lever 55, enabling the rotating shaft 54 to be synchronously rotated by and with selective movement of the lever 55.

Figure 4:
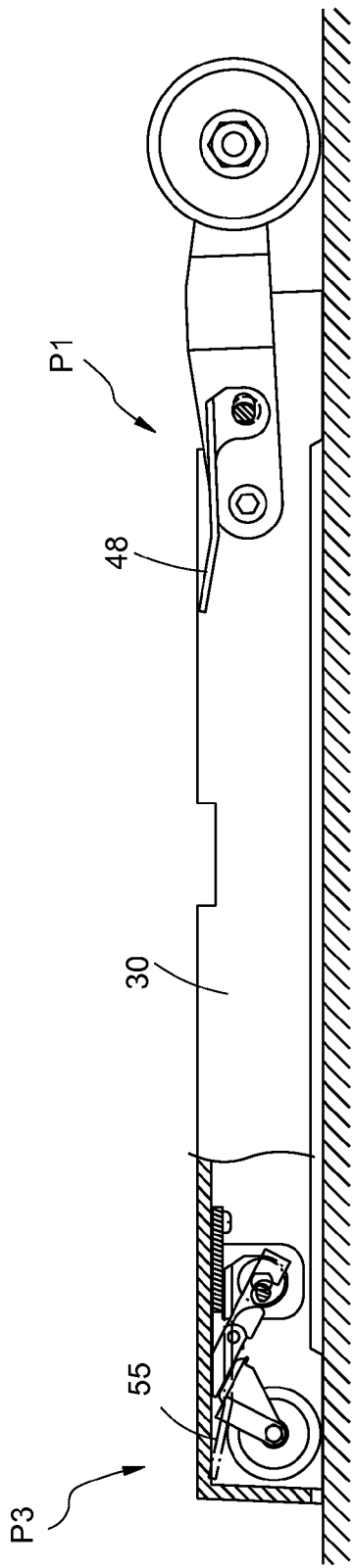
FIG. 4 is a sectional side view of the machine base assembly in accordance with the first embodiment of the present disclosure, illustrating the machine base maintained in contact with the floor with the driving member in a first position and the lever in a third position.
Figure 5:
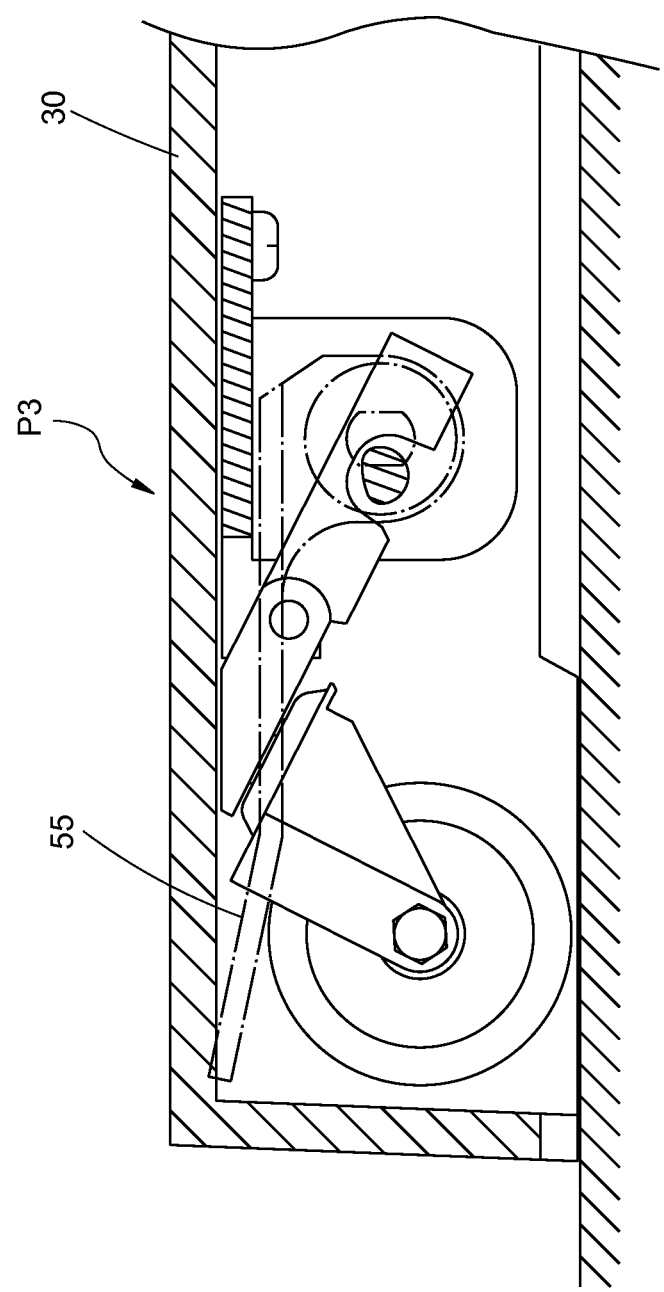
FIG. 5 is an enlarged partial view of a portion of FIG. 4, illustrating the lever in the third position.
Figure 6:
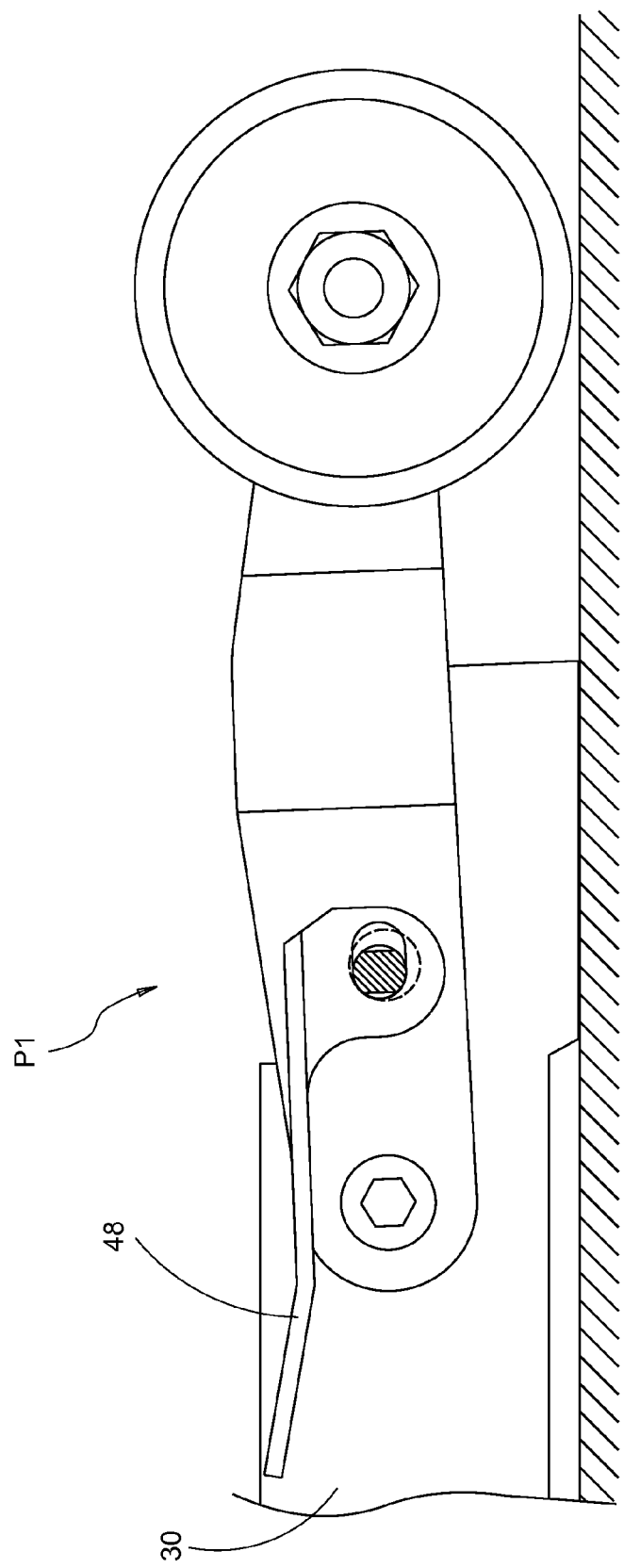
FIG. 6 is an enlarged partial view of a portion of FIG. 4, illustrating the driving member in the first position.

When the driving member 48 and the lever 55 are respectively disposed in a first position P1 and a third position P3, as shown in FIGS. 4-6, the base member 30 is maintained in contact with the floor, and therefore the machine tool 10 is firmly held in place for operation by a user.

Figure 7:
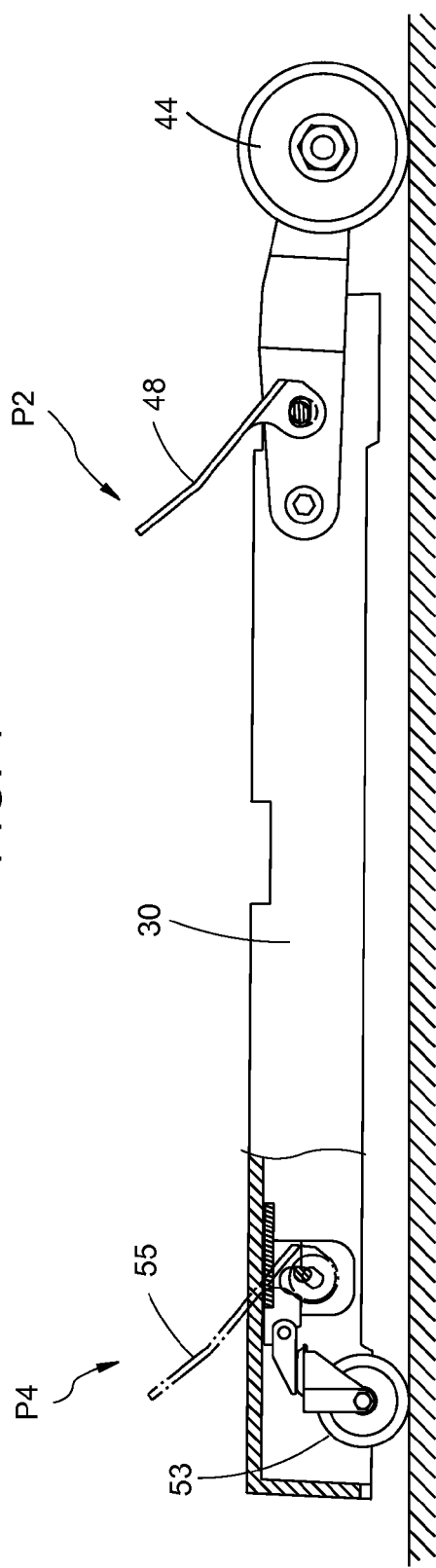
FIG. 7 is similar to FIG. 4, illustrating the machine base lifted from the floor with the driving member in a second position and the lever in a fourth position.
Figure 9:
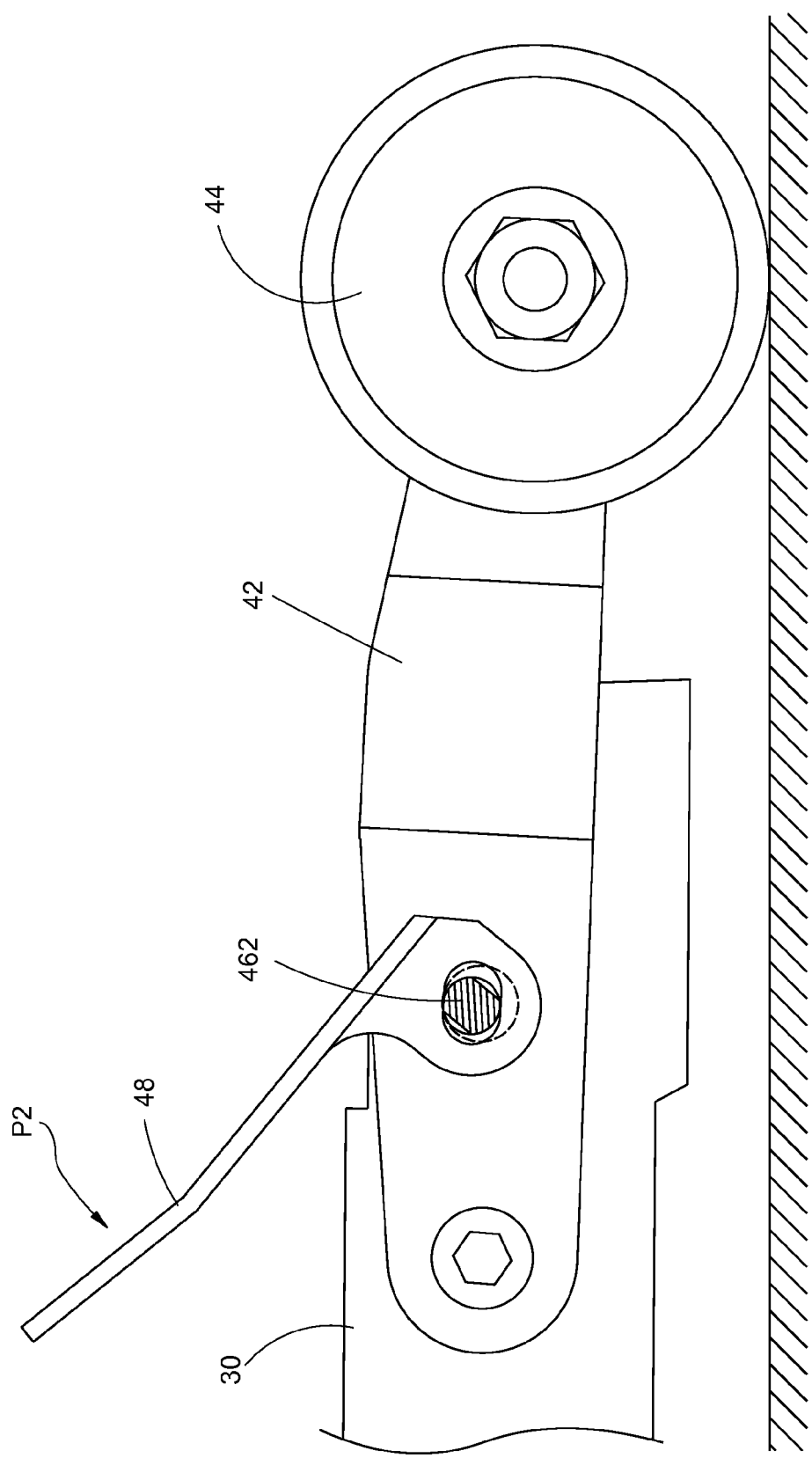
FIG. 9 is another enlarged partial view of a portion of FIG. 7, illustrating the lever in the second position.

When the operator moves the driving member 48 from the first position P1 to a second position P2, as shown in FIG. 9, the wheel shaft 46 is synchronously rotated with the movement of the driving member 48, and the lateral wheel frames 42 are moved with the end portions 462 of the wheel shaft 46 and the wheels 44 are thus lowered into contact with the floor. At this time, the machine tool 10 can be tilted for movement using only the lateral wheel set 40, or the operator can move the lever 55 from the third position P3 to a fourth position P4, as shown in FIG. 8, to rotate the rotating shaft 54 through a defined angle. During rotation of the rotating shaft 54, the eccentric block 562 of the first shaft member 56 is forced against the periphery of the bottom retaining notch 524 of the wheel holder 52, causing the wheel holder 52 to be moved to the position where the wheel holder 52 is retained against the top wall 512 of the mounting frame 51 and the bottom wheel 53 is maintained in contact with the floor. Thus, the machine base 30 is lifted from the floor by the two lateral wheels 44 and the bottom wheel 53, as shown in FIG. 7, and the operator can move the machine tool 1 to a desired position.

In conclusion, the machine base assembly enables the machine base to be firmly and stably supported on the floor before lowing of the lateral wheels and the bottom wheel so that the operator can operate the machine tool conveniently and safely. When the lateral wheels and the bottom wheel are lowered into contact with the floor, the machine base is lifted from the floor, and the operator can move the machine tool to the desired position by means of rotating the lateral wheels and the bottom wheel. Thus, the use of the lifting machine base assembly facilitates the operation and movement of the machine tool at a high level of safely.

Figure 10:
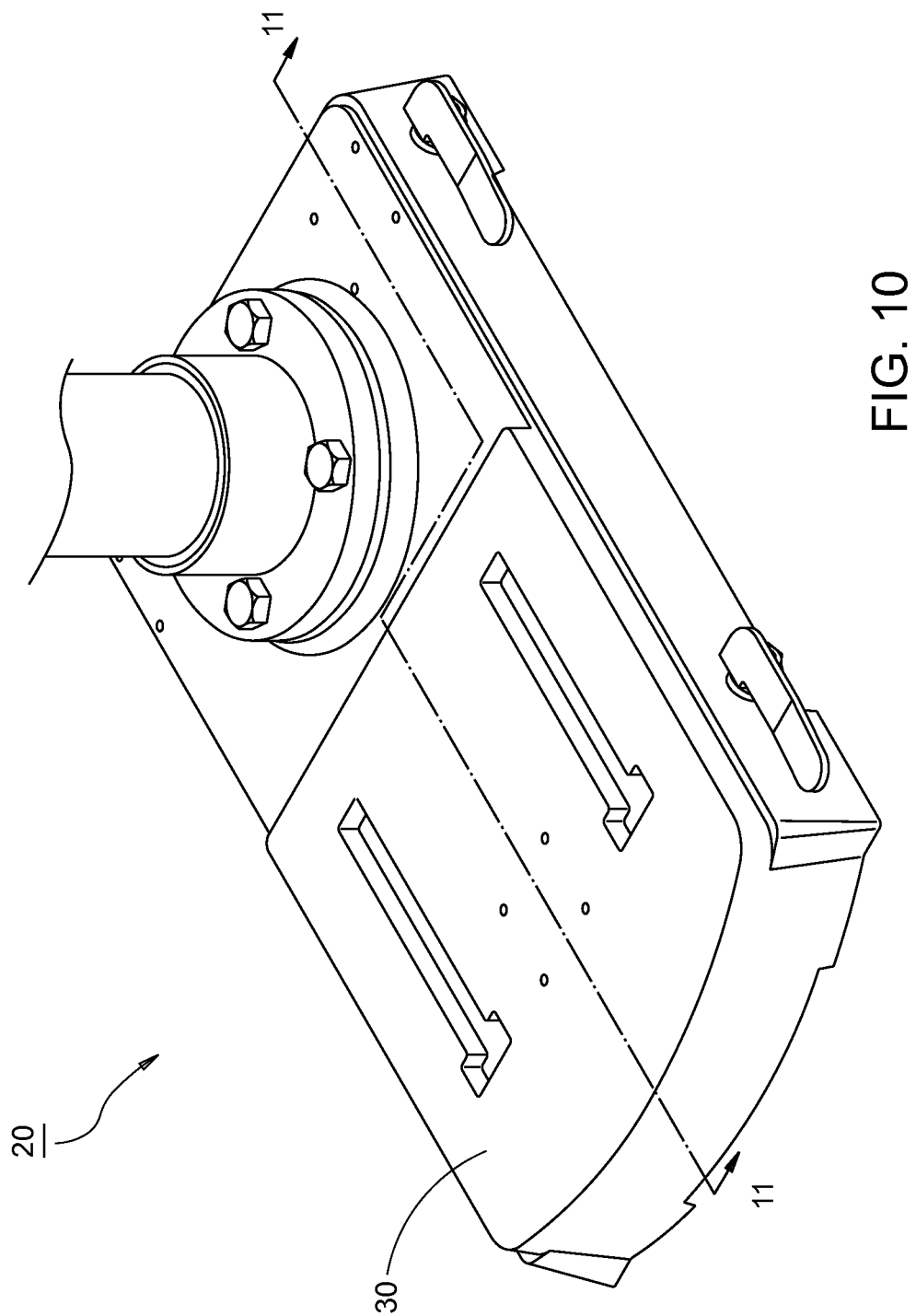
FIG. 10 is an elevational view of a machine base assembly in accordance with a second embodiment of the present disclosure.
Figure 11:
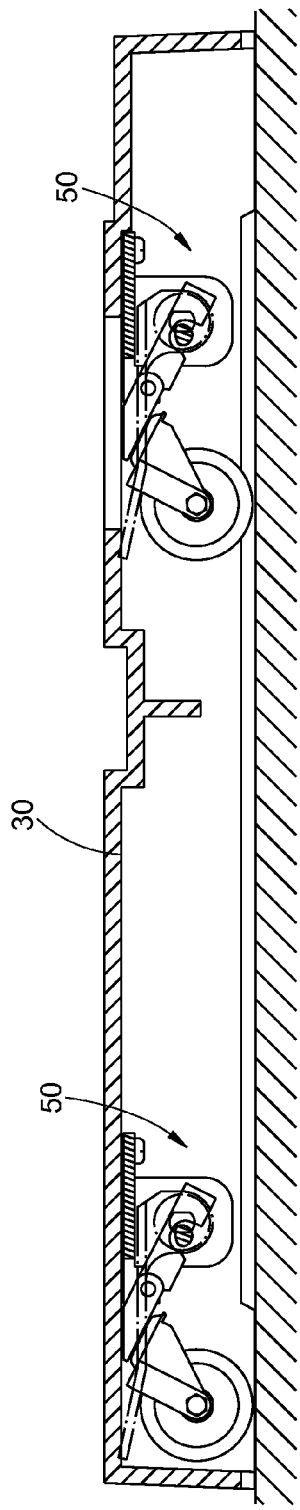
FIG. 11 is a sectional view taken along line 11-11 of FIG. 10, illustrating the machine base maintained in contact with the floor.
Figure 12:
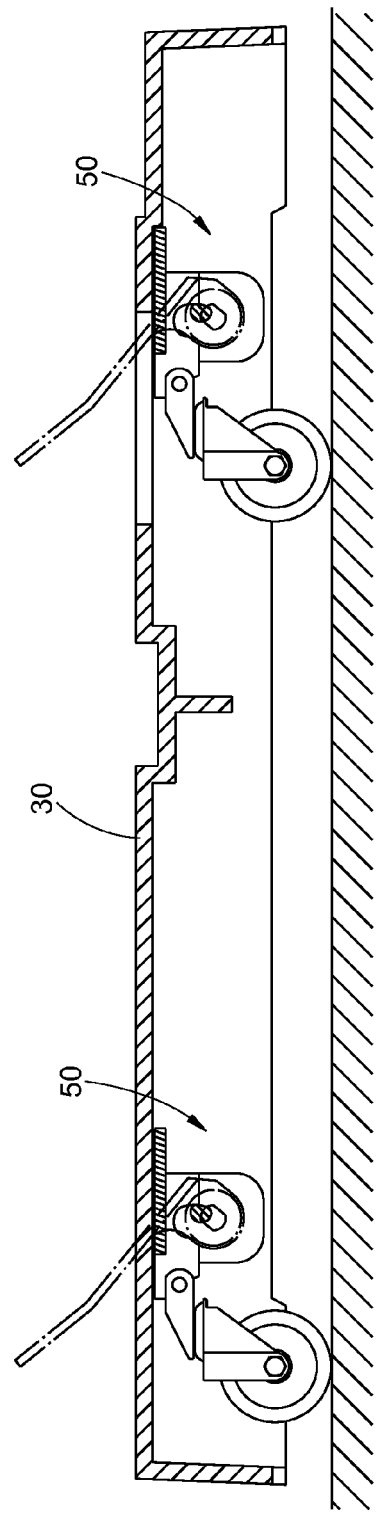
FIG. 12 is similar to FIG. 11, illustrating the machine base lifted from the floor.

It is to be understood that the structure of the machine base assembly 20 is not limited to the use of the lateral wheel set 40 and the bottom wheel set 50. Three bottom wheel sets 50 may be used as a substitute for enabling the machine base 30 to be wholly or partially lifted and lowered, i.e., one bottom wheel set 50 is arranged at the front bottom wall of the machine base 30 and the other two bottom wheel sets 50 are bilaterally arranged at the rear bottom wall of the machine base 30, as shown in FIGS. 10-12. As the structure and operation of the bottom wheel set 50 has been described in the aforesaid first embodiment, no further detailed description in this regard is necessary.

Although particular embodiments of the disclosure have been described in detail for purposes of illustration, various modifications and enhancements may be made without departing from the spirit and scope of the disclosure. Accordingly, the disclosure is not to be limited except as by the appended claims.

What is claimed is:
1. A lifting machine base assembly for use in a machine tool, comprising:
    a machine base; and
    a lateral wheel set, comprising
        two lateral wheel frames respectively pivotally connected to said machine base;
        two lateral wheels respectively mounted to said lateral wheel frames;
        a rotatable wheel shaft inserted through said machine base and eccentrically coupled between said two lateral wheel frames; and
        a driving member located directly adjacent to one of the lateral wheel frames and connected to one end of said wheel shaft and operable to rotate said wheel shaft between a first position, where said machine base is maintained in contact with the floor, and a second position, where said lateral wheel frames are pivoted by said wheel shaft to move said lateral wheels into contact with the floor to at least partially lift said machine base from the floor.

2. The lifting machine base assembly according to claim 1, wherein each said lateral wheel frame comprises a front end pivotally connected to one lateral sidewall of said machine base, and a rear end, wherein one said lateral wheel is coupled to the rear end thereof.

3. The lifting machine base assembly according to claim 2, wherein each said lateral wheel frame comprises an oblong hole disposed near the front end thereof; and said wheel shaft comprises two eccentric end portions respectively located on two opposite ends thereof and respectively inserted into the oblong holes of said two lateral wheel frames, wherein one said eccentric end portion is connected to said driving member.

4. The lifting machine base assembly according to claim 1, further comprising a bottom wheel set, having a mounting frame affixed to said machine base, a wheel holder having a middle part thereof pivotally connected to said mounting frame, a bottom wheel rotatably coupled to a front end of said wheel holder, a rotatable shaft inserted through said machine base and said bottom wheel frame and having first and second distal ends thereof, the first end thereof eccentrically connected to a rear end of said wheel holder, and a lever connected to the second end of said rotating shaft and operable to move said rotating shaft, the lever being selectively moveable between a third position, where said machine base is maintained in contact with the floor, and a fourth position, where said bottom wheel holder is pivoted by said rotating shaft to force said bottom wheel into contact with the floor to lift said machine base from the floor.

5. The lifting machine base assembly according to claim 4, wherein said wheel holder includes a bottom retaining notch disposed near the rear end thereof; and said rotating shaft includes an eccentric block engaged with said bottom retaining notch of said wheel holder.

6. The lifting machine base assembly according to claim 5, wherein said rotatable shaft comprises a first shaft member rotatably inserted through said wheel holder, said first shaft member having a first end thereof terminating in said eccentric block, and a second shaft member rotatably inserted through said machine base and axially connected to an opposite second end of said first shaft member.

7. The lifting machine base assembly according to claim 4, wherein said mounting frame comprises two opposed sidewalls; and said wheel holder is pivotally coupled between the two opposed sidewalls of said mounting frame.

8. A lifting machine base assembly for use in a machine tool, comprising:
  a machine base; and
  at least one bottom wheel set, comprising
    a mounting frame having a top wall affixed to said machine base and two sidewalls downwardly extending from the top wall, a wheel holder having a middle part thereof pivotally connected between the two sidewalls of said mounting frame, a bottom wheel rotatably coupled to a front end of said wheel holder, a rotatable shaft inserted through said machine base and said bottom wheel frame and having first and second distal ends thereof, the first end thereof eccentrically connected to a rear end of said wheel holder, and a lever connected to the second end of said rotating shaft and operable to move said rotating shaft, the lever being selectively moveable between a third position, where said machine base is kept in contact with the floor, and a fourth position, where said bottom wheel holder is pivoted by said rotating shaft to force said bottom wheel into contact with the floor to lift said machine base from the floor.

9. The lifting machine base assembly according to claim 8, wherein said wheel holder includes a bottom retaining notch disposed near the rear end thereof; and said rotating shaft includes an eccentric block engaged with said bottom retaining notch of said wheel holder.

10. The lifting machine base assembly according to claim 9, wherein said rotatable shaft comprises a first shaft member rotatably inserted through said wheel holder, said first shaft member having a first end thereof terminating in said eccentric block, and a second shaft member rotatably inserted through said machine base and axially connected to an opposite second end of said first shaft member.

11. The lifting machine base assembly according to claim 8, further comprising at least two bottom wheel sets.

12. A lifting machine base assembly for use in a machine tool, comprising:
  a machine base; and
  a lateral wheel set, comprising
    two lateral wheel frames respectively pivotally connected to said machine base;
    two lateral wheels respectively mounted to said lateral wheel frames;
    a rotatable wheel shaft inserted through said machine base and eccentrically coupled between said two lateral wheel frames; and
    a driving member connected to one end of said wheel shaft and operable to rotate said wheel shaft between a first position, where said machine base is maintained in contact with the floor, and a second position, where said lateral wheel frames are pivoted by said wheel shaft to move said lateral wheels into contact with the floor to at least partially lift said machine base from the floor; and
  a bottom wheel set, comprising:
    a mounting frame affixed to said machine base;
    a wheel holder having a middle part thereof pivotally connected to said mounting frame;
    a bottom wheel rotatably coupled to a front end of said wheel holder;
    a rotatable shaft inserted through said machine base and said bottom wheel frame and having first and second distal ends thereof, the first end thereof eccentrically connected to a rear end of said wheel holder; and
    a lever connected to the second end of said rotating shaft and operable to move said rotating shaft, the lever being selectively moveable between a third position, where said machine base is maintained in contact with the floor, and a fourth position, where said bottom wheel holder is pivoted by said rotating shaft to force said bottom wheel into contact with the floor to lift said machine base from the floor.

13. The lifting machine base assembly according to claim 12, wherein each said lateral wheel frame comprises a front end pivotally connected to one lateral sidewall of said machine base, and a rear end, wherein one said lateral wheel is coupled to the rear end thereof.

14. The lifting machine base assembly according to claim 13, wherein each said lateral wheel frame comprises an oblong hole disposed near the front end thereof; and said wheel shaft comprises two eccentric end portions respectively located on two opposite ends thereof and respectively inserted into the oblong holes of said two lateral wheel frames, wherein one said eccentric end portion is connected to said driving member.

15. The lifting machine base assembly according to claim 12, wherein said wheel holder includes a bottom retaining notch disposed near the rear end thereof; and said rotating shaft includes an eccentric block engaged with said bottom retaining notch of said wheel holder.

16. The lifting machine base assembly according to claim 15, wherein said rotatable shaft comprises a first shaft member rotatably inserted through said wheel holder, said first shaft member having a first end thereof terminating in said eccentric block, and a second shaft member rotatably inserted through said machine base and axially connected to an opposite second end of said first shaft member.

17. The lifting machine base assembly according to claim 12, wherein said mounting frame comprises two opposed sidewalls; and said wheel holder is pivotally coupled between the two opposed sidewalls of said mounting frame.

* * * * *